United States Patent
Mohd et al.

(10) Patent No.: US 8,559,640 B2
(45) Date of Patent: Oct. 15, 2013

(54) METHOD OF INTEGRATING QUANTUM KEY DISTRIBUTION WITH INTERNET KEY EXCHANGE PROTOCOL

(75) Inventors: Mohd. Aminudin Bin Mohd, Kuala Lumpur (MY); Sharipah Binti Setapa, Kuala Lumpur (MY)

(73) Assignee: MIMOS Berhad, Kuala Lumpur (MY)

( * ) Notice: Subject to any disclaimer, the term of this patent is extended or adjusted under 35 U.S.C. 154(b) by 56 days.

(21) Appl. No.: 13/063,167

(22) PCT Filed: Sep. 3, 2009

(86) PCT No.: PCT/MY2009/000133
§ 371 (c)(1),
(2), (4) Date: Mar. 9, 2011

(87) PCT Pub. No.: WO2010/030161
PCT Pub. Date: Mar. 18, 2010

(65) Prior Publication Data
US 2011/0188659 A1    Aug. 4, 2011

(30) Foreign Application Priority Data
Sep. 10, 2008    (MY) ............... PI 2008 3506

(51) Int. Cl.
*H04L 9/12* (2006.01)
(52) U.S. Cl.
USPC .......................................... 380/278; 713/171
(58) Field of Classification Search
None
See application file for complete search history.

(56) References Cited

U.S. PATENT DOCUMENTS

| | | |
|---|---|---|
| 2004/0184615 A1 | 9/2004 | Elliott et al. |
| 2005/0063547 A1 | 3/2005 | Berzanskis et al. |
| 2006/0212936 A1 | 9/2006 | Berzanskis et al. |
| 2008/0147820 A1* | 6/2008 | Maeda et al. ................. 709/213 |

OTHER PUBLICATIONS

M. A. Sfaxi, and S. Ghernaouti-hélie, and G. Ribordy, and O. Gay, "Using Quantum Key Distribution within IPSEC to secure MAN communications," MAN 2005 conference [online], [retrived on Sep. 25, 2012]. Retrieved from the Internet <URL:http://citeseerx.ist.psu.edu/viewdoc/summary?doi=10.1.1.132.2333>.*

D. Maughan et al., "Internet Security Association and Key Management Protocol (ISAKMP)," RFC 2408 [online] Nov. 1998, [retrieved on Sep. 25, 2012]. Retrieved from the Internet <URL:http://www.ietf.org/rfc/rfc2408.txt>.*

D. Harkins et al., "The Internet Key Exchange (IKE)," RFC 2409 [online] Nov. 1998, [retrieved on Sep. 25, 2012]. Retrieved from the Internet <URL:http://www.ietf.org/rfc/rfc2409.txt>.*

Written Opinion of the International Searching Authority cited in Application Serial No. PCT/MY2009/000133.

* cited by examiner

*Primary Examiner* — Gilberto Barron, Jr.
*Assistant Examiner* — Izunna Okeke
(74) *Attorney, Agent, or Firm* — Workman Nydegger

(57) ABSTRACT

A method of integrating quantum key distribution with Internet key exchange protocol, wherein the method comprises exchanging quantum-shared secret index from a cryptographic key database in Phase 1 of the Internet key exchange protocol between an initiator and a responder (100), integrating a number of quantum-shared secret from the cryptographic key database with classic shared secret using a predetermined operation mode in Phase 2 of the Internet key exchange protocol (200) to generate an array of security associations to be used by the initiator and the responder during a single Internet key exchange session, and managing inbound and outbound of the array of security associations in a security association database (402) using a database structure.

18 Claims, 4 Drawing Sheets

METHOD OF INTEGRATING QUANTUM KEY DISTRIBUTION WITH INTERNET KEY EXCHANGE PROTOCOL

FIELD OF INVENTION

The present invention relates to a method of integrating quantum key distribution with Internet key exchange protocol.

BACKGROUND ART

The digital telecommunications era has encouraged corporations and institutions to expand their reach globally covering wide geographical areas. Subsequently, there was a need to establish high-speed and secure, yet cost effective communication between the private networks of these corporations and institutions and their corresponding remote individual users or distant sites. This need was satisfied by Virtual Private Network (VPN), a technology where a virtual communication link is created between peer gateways, as and when it is required, over the readily available shared public telecommunication infrastructure, the Internet, to provide remote individual users or distant sites, access to the private networks of their corresponding corporations and institutions. VPN technology, having the advantage of cost effectiveness, superseded the system of leased lines. Dedicated leased lines are expensive, as it requires the use of large bandwidth to provide a permanent communication link between the private networks of these corporations and institutions and their corresponding remote individual users or distant sites.

The challenge faced by VPN technology was the aspect of security, given the fact that confidential data is being transmitted over virtual links that ride on the Internet, a shared public infrastructure that is open to and constantly monitored by third party or competitors. To overcome this, all VPN's are equipped with some form of security system that ensures security of the virtual link, thus maintaining the confidentiality and integrity of data transmitted over these virtual links. Internet Protocol Security (IPSec) is one of the many forms of security systems. IPSec can be implemented either in tunnel mode or transport mode. IPSec tunnel mode encrypts the IP header and the payload, whereas transport mode only encrypts the IP payload. The more commonly used IPSec mode is the tunnel mode, where an IPSec tunnel is created to provide security for confidential data being transmitted over virtual links.

IPSec uses Internet security association and key management protocol (ISAKMP) to establish security associations and cryptographic keys. ISAKMP defines the procedures for authenticating peer gateways, particularly the creation and management of security associations and cryptographic key generation techniques.

Security association is an agreement between peer gateways and it specifies an agreed convention in relation to encryption and hash algorithm as well as information pertaining to cryptographic key lifetime. Cryptographic key generation and distribution is the process of establishing a shared secret between peer gateways and the technique includes, amongst others, quantum cryptography or quantum key distribution (QKD).

The standard deployment of ISAKMP utilizes Internet key exchange (IKE) protocol, a protocol used to securely exchange cryptographic key in an IPSec tunnel, although other exchange protocols or methods may be implemented for the same purpose. IKE uses the Diffie-Hellman algorithm to automate cryptographic key exchange.

The IKE protocol comprises 2 phases; Phase 1 and Phase 2 that peer gateways must go through when establishing security associations. Phase 1 is used to authenticate each peer gateway and to establish a secure channel between these peer gateways. Subsequently, after Phase 1 is completed, Phase 2 will use the secure channel established in Phase 1 to negotiated and generate cryptographic key materials that will be used to generate security association information managed by the security association database.

The standard IKE protocol creates one security association for a single IKE session. Each security association has a lifetime and upon expiration of the same, a new IKE session is initiated to renegotiate a new security association. The frequency of renewing and exchanging security associations is limited, given the fact that IKE is an interactive protocol, where security association renewal and exchange is performed over a shared public infrastructure. Hence, the frequency of renewing security association depends on the complexity of cryptographic key generation, whereas the frequency of exchanging security association depends on the congestion of the public network. One security association for a single IKE session hinders the implementation of short lifetime setup for IPSec keys that enhances the security level of a virtual link created in the VPN. This is due to the fact the implementation of short lifetime setup for IPSec keys requires a high frequency of renewing and exchanging security associations, whereby, if the corresponding security association was not renewed at the time of expiration of the IPSec key lifetime, errors in packet decryption will occur at the receiving gateway. Therefore, the implementation of short lifetime setup for IPSec key requires multiple security associations to be generated in a single IKE session.

SUMMARY OF INVENTION

In one embodiment of the present invention is a method of integrating quantum key distribution with Internet key exchange protocol, wherein the method comprises exchanging quantum-shared secret index from a cryptographic key database in Phase 1 of the Internet key exchange protocol between an initiator and a responder, integrating a number of quantum-shared secret from the cryptographic key database with classic shared secret using a predetermined operation mode in Phase 2 of the Internet key exchange protocol to generate an array of security associations to be used by the initiator and the responder during a single Internet key exchange session, and managing inbound and outbound of the array of security associations in a security association database using a database structure.

The present invention consists of several novel features and a operation of parts hereinafter fully described and illustrated in the accompanying drawings, it being understood that various changes in the details may be made without departing from the scope of the invention or sacrificing any of the advantages of the present invention.

BRIEF DESCRIPTION OF THE ACCOMPANYING DRAWINGS

For the purpose of facilitating and understanding of the present invention, there is illustrated in the accompanying drawings, from an inspection of which, when considered in connection with the following description, the invention, its construction and operation and many of its advantages would be readily understood and appreciated.

DETAILED DESCRIPTION OF THE PREFERRED EMBODIMENTS

The present invention relates to a method of integrating quantum key distribution with Internet key exchange protocol. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The method of integrating quantum key distribution (QKD) with the Internet key exchange (IKE) protocol of the present invention provides a method of integrating QKD with Phase 1 and Phase 2 of the IKE protocol, whereby quantum-shared secret of the QKD is used in combination with the existing classic Diffie-Hellman shared secret of the IKE protocol, to generate multiple security associations in a single IKE session to be used by peer gateways, an initiator and a responder. These multiple security associations are managed by an enhanced security association database, whereby the enhancement relates to the application of a database structure in the security association database.

QKD is a cryptographic key generation and distribution technique. It is an independent system that can be implemented in parallel with the standard IKE protocol. QKD technology can be considered matured as it has the capability to generate secured shared secrets known as quantum-shared secrets at high speed, and these quantum-shared secrets are indexed and stored in a cryptographic key database. In other embodiments of the invention, the cryptographic key database comprises of any cryptographic key database, and not limited to a QKD database. The description and drawings herein refer to the cryptographic key database as a QKD database for convenience of explanation and illustration. The QKD database consists of identical quantum-shared secrets that are indexed with positive integers, known as QKD database Identifier (QID).

This capability of generating quantum-shared secrets at high speed is leveraged by way of integrating quantum-shared secret of the QKD with the standard IKE protocol to generate multiple security associations in a single IKE session. This IKE-QKD protocol enables the implementation short lifetime setup for IPSec key to enhance the security level of a virtual link created in the Virtual Private Network (VPN), without causing errors in packet decryption at the receiving gateway.

Figure 1:
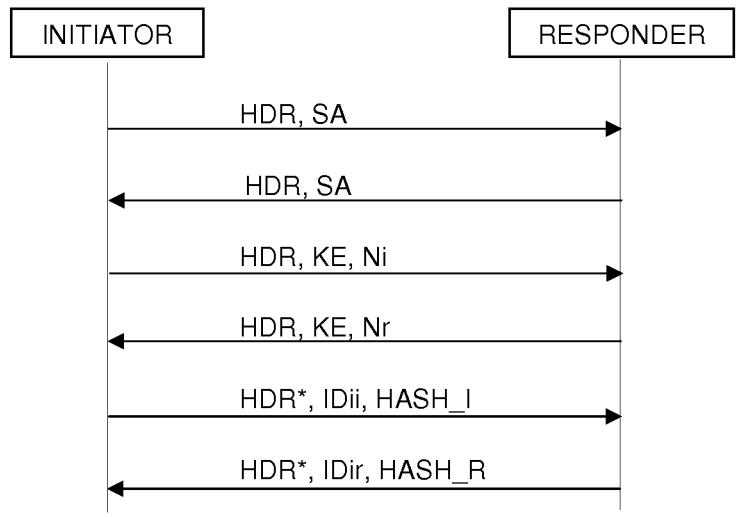
FIG. 1 is an illustrative view of the prior art for Phase 1 of the IKE protocol.
Figure 3:
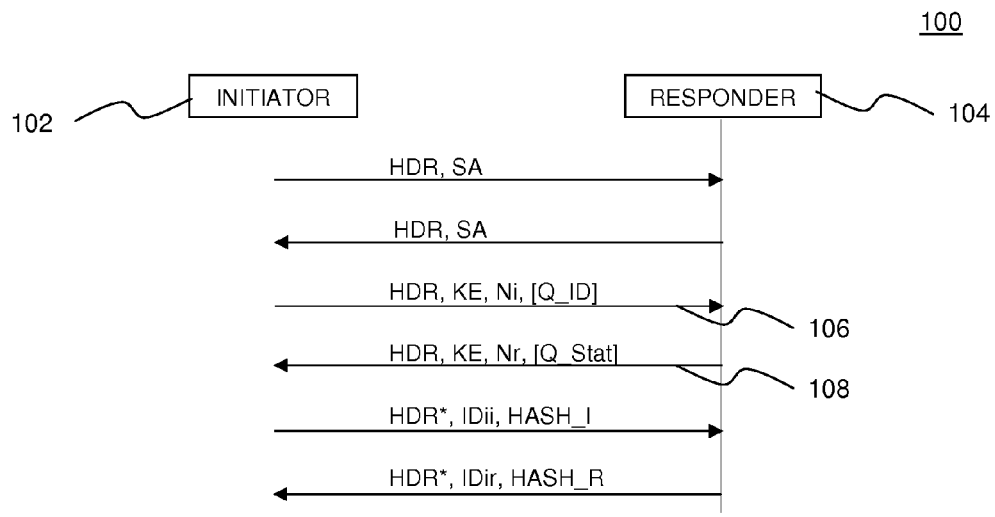
FIG. 3 is an illustrative view of Phase 1 of the IKE-QKD protocol.

Reference is now being made to FIG. 1 and FIG. 3. FIG. 1 is an illustrative view of the standard Phase 1 of the IKE protocol. FIG. 3 is an illustrative view of Phase 1 of the IKE-QKD protocol where QKD is integrated to the standard Phase 1 of the IKE protocol to include exchanging quantum-shared secret index from the QKD database between the initiator and the responder (100).

Phase 1 of the IKE protocol is used to authenticate the initiator and the responder to establish a secure channel across the virtual communication link in a VPN. A secure channel is established by configuring identical shared secret at the initiator and the responder, and QKD is integrated by exchanging quantum-shared secret index from the QKD database between the initiator and the responder (100). This integration may be implemented in both modes of Phase 1, the main mode as well as the aggressive mode.

The main mode of Phase 1 is designed for identity protection and it involves six message exchanges between the initiator and the responder. The aggressive mode of Phase 2 does not cater for identity protection and hence it involves only three message exchanges between the initiator and the responder. Regardless of the mode specified for Phase 1 of the IKE session, quantum-shared secret of the QKD can be integrated with the IKE protocol.

Reference is now being made to FIG. 3. For the main mode of Phase 1, in addition to the classic Diffie-Hellman exchange that occurs during the $3^{rd}$ message (106) of Phase 1, the initiator (102) sends a value, Q_ID to the responder (104). Q_ID is the QKD database identifier representing the quantum-shared secret index that indicates or points to the related quantum-shared secret to be used to establish a secure channel between the initiator and the responder. Both the initiator and the responder use the Q_ID value to fetch identical quantum-shared secret from the QKD database.

In the $4^{th}$ message exchange (108) of Phase 1, the responder (104) returns a value, Q_Stat to the initiator (102). Q_Stat indicates the status of the QKD database, which reflects the status of the quantum-shared secret index exchange in Phase 1 of the Internet key exchange protocol.

As for the aggressive mode, in addition to the classic Diffie-Hellman exchange that occurs during the $1^{st}$ message of Phase 1, the initiator (102) sends a value, Q_ID to the responder (104) and in the $2^{nd}$ message exchange of Phase 1, the responder (104) returns a value, Q_Stat to the initiator (102).

The quantum-shared secret and classic Diffie-Hellman shared secret ($g^{xy}$) is used to generate an intermediary key, SKEYID_d using pseudo-random function (prf). This key is then used to generate keys for encryption, SKEYID_e and authentication, SKEYID_a respectively, to encrypt and authenticate messages in Phase 2 of the IKE protocol. SKEYID_d is given by either one of the two:

SKEYID_d=prf (SKEYID, $g^{xy}$ XOR quantum_shared_secret|CKY-I|CYK-R|0)

or

SKEYID_d=prf (SKEYID, $g^{xy}$|CKY-I|CKY-R|0) XOR quantum_share_secret SKEYID_e and SKEYID_a are given by:

SKEYID_a=prf (SKEYID, SKEYID_d|CKY-I|CKY-R|1)
SKEYID_e=prf (SKEYID, SKEYID_a|CKY-I|CKY-R|2)

At the end of Phase 1, a secure channel is established with both the initiator and the responder authenticated whereby both share identical classic Diffie-Hellman shared secret ($g^{xy}$) and quantum-shared secret.

Figure 2:
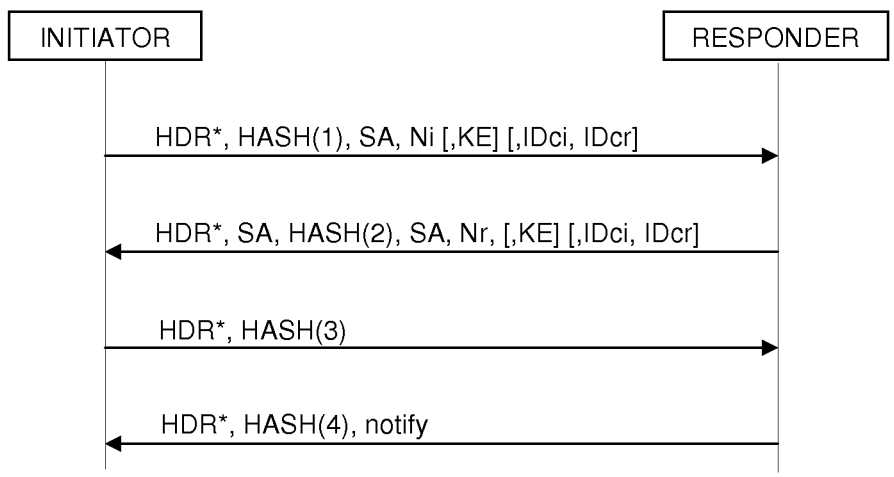
FIG. 2 is an illustrative view of the prior art for Phase 2 of the IKE protocol.
Figure 4:
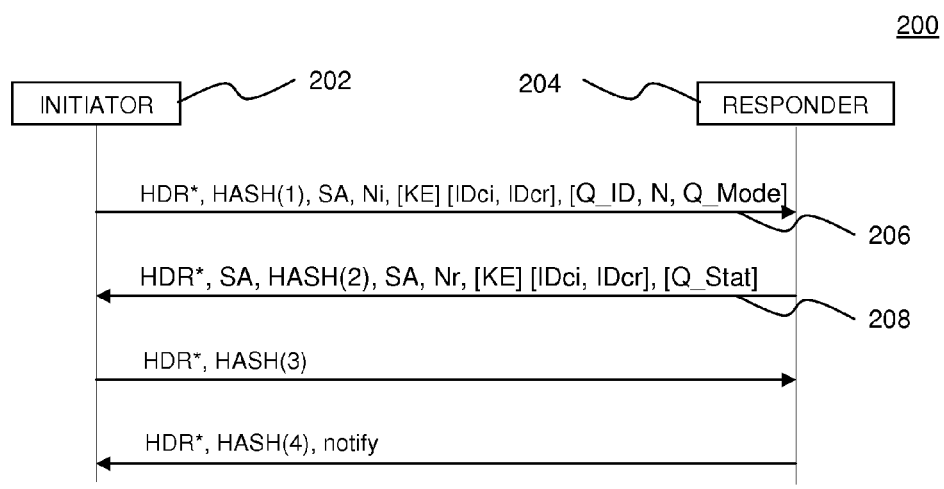
FIG. 4 is an illustrative view of Phase 2 of the IKE-QKD protocol.

Reference is now being made to FIG. 2 and FIG. 4. FIG. 2 is an illustrative view of the standard Phase 2 of the IKE protocol. FIG. 4 is an illustrative view of Phase 2 of the IKE-QKD protocol where QKD is integrated to the standard Phase 2 of the IKE protocol to integrate a number of quantum-shared secret from the QKD database with classic Diffie-Hellman shared secret using a predetermined operation mode (200) to generate an array of security associations to be used by the initiator and the responder during a single IKE session.

Phase 2 uses the secure channel established in Phase 1 to exchange security association information. Messages exchanged during Phase 2 of the IKE protocol are encrypted and authenticated using SKEYID_e and SKEYID_a respectively, by way of either one of the two exchange schemes that are defined. The first exchange scheme does not provide perfect forward secrecy, while the second exchange scheme does. Regardless of the scheme specified for Phase 2 of the IKE session, Phase 2 generates security associations and key materials that are used in the IPSec system to maintain the confidentiality and integrity of data transmitted over virtual communication links in VPN.

Reference is now being made to FIG. 4. In addition to using the classic DH shared secret for encryption, during the $1^{st}$ message exchange (206) of Phase 2, the initiator sends a new Q_ID value to the responder in addition to the value N and the value Q_Mode. Q_ID is the QKD database identifier representing the quantum-shared secret index that indicates or points to the related quantum-shared secret to be used in the perfect forward secrecy scheme. Additionally, the initiator (102) sends to the responder (104) a value N, a positive integer indicating the number of quantum-shared secret to be fetched and a value, Q_Mode, indicating the predetermined operation mode to be used to integrate the quantum-shared secret with classic Diffie-Hellman shared secret. In the $2^{nd}$ message exchange (208), the responder (204) returns a value, Q_Stat to the initiator (202). Q_Stat indicates the status of the generation of the array of security associations. At this point, both the initiator and the responder have N numbers of identical quantum-shared secret with index Q_ID, Q_ID+1 . . . and Q_ID+N−1.

Multiple cryptographic keys or key materials are generated and are subsequently used to generate multiple security associations in a single IKE session. The method of creating a key material (KEYMAT) using the N numbers of quantum-shared secrets is supported by three modes of operation. In general, KEYMAT is given by either:

KEYMAT=prf (SKEYID_d, quantum_shared_secret XOR g(qm)^xy, protocol, SPI, Ni_b, Nr_b)

or

KEYMAT=prf (SKEYID_d, g(qm)^xy, protocol, SPI, Ni_b, Nr_b) XOR quantum_shared_secret The first operation mode of creating KEYMAT is the Direct Mode. This mode is suitable for QKD systems that generate quantum-shared secrets at a high rate and the quantum bit error rate (QBER) of the quantum channel is substantially low. Using this mode, N number of quantum-shared secret is used directly to create N number of KEYMAT. Subsequently, N number of security associations with different cryptographic key material is generated.

The second operation mode is the Combinatorial Mode. This mode is suitable to support quantum channel with high quantum bit error rate (QBER), which results in lower quantity of quantum-shared secret being generated. Using this mode, N+(N!/(2!(N−2)!) pairs from N number of quantum-shared secrets are XORed to produce N+(N!/(2!(N−2)!) number of shared secrets.

The third operation mode is the Termination Mode and this mode is used to terminate IPSec tunnels when the quantum bit error rate (QBER) is very high given that the QKD device or any security-monitoring module has detected eavesdropper activities.

Unlike the standard IKE protocol where a new IKE session is initiated to renegotiate a new security association once the lifetime of the active security association has expired, the IKE-QKD protocol need not initiate a new IKE session upon expiration of the lifetime of the active security association. This is due to the fact that multiple security associations with each having unique cryptographic key material or KEYMAT have been created for a single IKE session and is readily available for the IPSec tunnels in the IPSec system.

Figure 5:
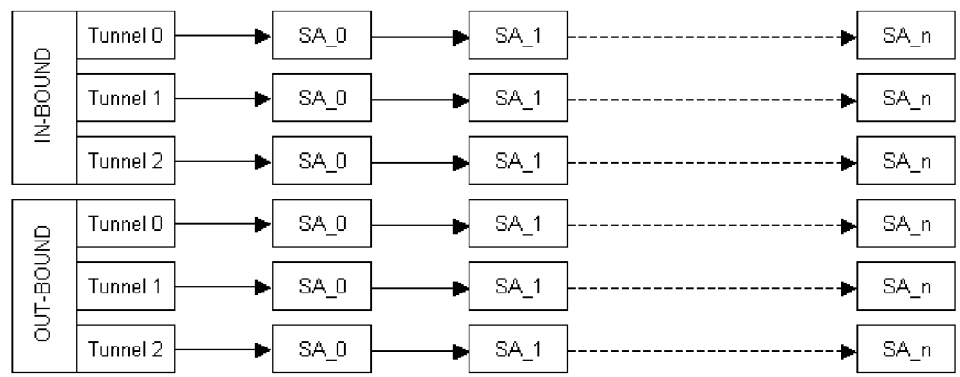
FIG. 5 is an illustrative view of IPSec tunnel with multiple security associations.

Reference is now being made to FIG. 5. The commonly used IPSec mode is the tunnel mode and FIG. 5 illustrates three IPSec tunnels whereby each tunnel is protected by multiple security associations. The standard implementation of IPSec only supports one security association per IPSec tunnel. In the implementation of IKE-QKD protocol, the number of security associations per IPSec tunnel depends on the operation mode used in Phase 2 of the IKE-QKD protocol. In the illustration of FIG. 5, all three IPSec tunnels use the Direct Mode since each tunnel has N number of security associations managed by a database structure in the security association database. The cryptographic key material or KEYMAT in each security association is used by the Encapsulating Security Payload (ESP) and Authentication Header (AH) to encrypt and decrypt transmitted data.

Figure 6:
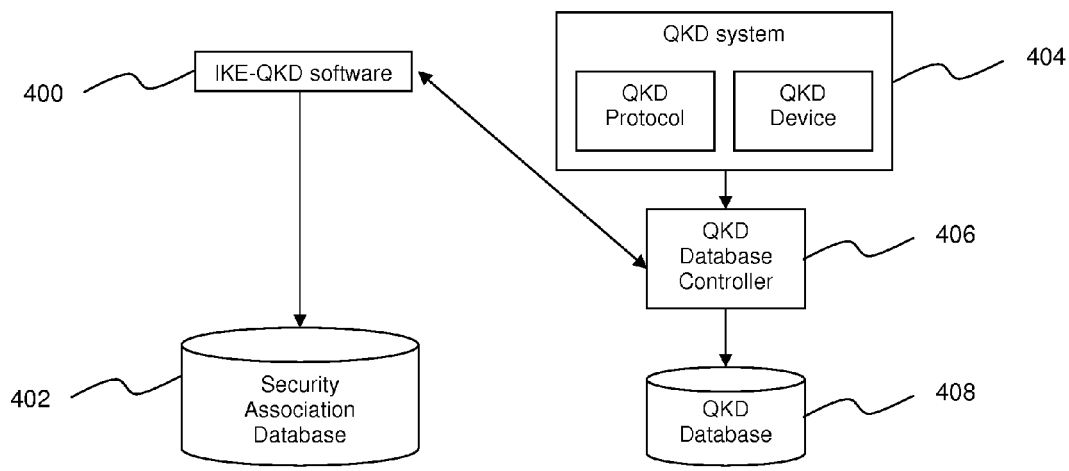
FIG. 6 is an illustrative view of the IKE-QKD system.

Reference is now being made to FIG. 6. FIG. 6 illustrates the components of the IKE-QKD system that integrates QKD with Phase 1 and Phase 2 of the IKE protocol. The components include an IKE-QKD software (400) that communicates with the QKD database controller (406) and generates multiple security associations using the IKE-QKD protocol. These multiple security associations are managed by the security association database (402). The QKD system (404) includes a QKD protocol comprising of a combination of hardware and software that implement error correction and privacy amplification and a QKD device that is a photonic device used to implement quantum communication. The QKD database controller (406) comprises of a combination of hardware and software that protects the QKD database (408) from unauthorized access and permits access only to registered components. Finally, the QKD database (408) is a relational database that stores quantum-shared secrets indexed with positive integers.

The multiple security associations generated in a single IKE session are managed as an array of security associations in the security association database (402). For this purpose, the security association database (402) applies a particular database structure where one of the many database structures such as hash, table and linked list structure may be applied. The description and drawings herein refers to the database structure as a linked list structure for convenience of explanation and illustration.

Each security association in the array of security associations is linked to the following or subsequent security association. Each IPSec tunnel of the tunnel mode has a set of controller pointers to manage these security associations such that the encryption and decryption of transmitted data is performed without errors. The IKE-QKD software (400) directs the pointers to manage the inbound and outbound of the array of security associations.

Prior to expiration of the lifetime of a security association, generally three quarter through the security association lifetime, the IKE session begins renegotiating a new array of security associations. This interval time of renegotiation is known as renegotiation time and is determined by the IKE-QKD software (400). Renegotiation time depends on the status of the security associations in the security association database (402) as well as the congestion of the public network. After an IKE session renegotiation, a new array of security associations is generated. This new array of security associations is appended to the existing security association linked list structure and each security association is indexed with a security association ID number that is incremented automatically.

Each security association has a lifetime; either based on byte-lifetime or time-lifetime, and is calculated after the security association is activated for use in encryption and decryption of transmitted data. Each IPSec tunnel has 2 types of security association lifetime namely the inbound security association lifetime and outbound security association lifetime. Each inbound security association has an inbound security association lifetime and each outbound security association has an outbound security association lifetime. The inbound security association lifetime and the outbound security association lifetime is used to monitor and manage the inbound security association and outbound security association respectively. Additionally, each inbound security association has an inbound max-lifetime, which is estimated to be greater than the renegotiation time. Inbound max-lifetime is an optional parameter and is made available if specified by the IKE session.

Inbound max-lifetime is used to monitor unused inbound security associations. If a security association has been utilized for data decryption, there is possibility that the previous security association nodes were not used, due to packet transmission error. At this point, the IKE software initiates a counting time for max-lifetime in the previous nodes. The inbound max-lifetime counter is stopped at the instance when the security association is used for decryption and at this point, inbound security association lifetime begins.

Figure 7:
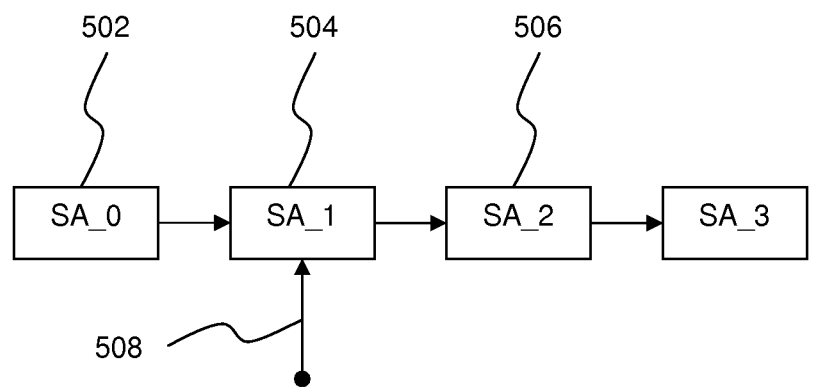
FIG. 7 is an illustrative view of the linked list structure applied in the security association database.

Reference is now being made to FIG. 7. The inbound and outbound arrays of security associations are managed by the linked list structure (500) whereby the controller pointer (508) points to an active security association (504) that is being used in the current IKE session and monitors the lifetime of the active security association (504). If lifetime of the active security association (504) has expired, the active security association (504) is deleted from the linked list. The controller pointer (508) then points to a following or subsequent security association (506) in the array of security associations to be used in the current IKE session. During this period, the IKE-QKD software need not initiate a new IKE session upon expiration of the lifetime of the active security association, since multiple security associations are generated in a single IKE session by the IKE-QKD protocol.

The linked list structure (500) security association management technique implements garbage collection mechanism to ensure memory area is managed properly and efficiently. Garbage collection mechanism is important in multiple security associations system since the accumulation of deleted security associations (502) will degrade the performance of the IKE-QKD system.

The method of integrating QKD with the IKE protocol as proposed herein may also be implemented in IKE version 2. The IKE_SA_INIT of the IKE version 2 corresponds to Phase 1 of IKE version 1, and CREATE_CHILD_SA of the IKE version 2 corresponds to Phase 2 of IKE version 1, where IKE version 1 relates to the IKE protocol described herein.

The invention claimed is:

1. A method of integrating quantum key distribution with Internet key exchange protocol, wherein the method comprises:
   exchanging quantum-shared secret index from a cryptographic key database in Phase 1 of the Internet key exchange protocol between an initiator and a responder;
   integrating a number of quantum-shared secrets from the cryptographic key database with a classic shared secret using a predetermined operation mode in Phase 2 of the Internet key exchange protocol to generate an array of security associations to be used by the initiator and the responder during a single Internet key exchange session, wherein integrating a number of quantum-shared secrets from the cryptographic key database with a classic shared secret using a predetermined operation mode in Phase 2 of the Internet key exchange protocol to generate the array of security associations to be used by the initiator and the responder during a single Internet key exchange session comprises:
   the initiator sending to the responder:
      a value, Q_ID, representing the quantum-shared secret index;
      a value N, indicating the number of quantum-shared secrets; and
      a value, Q_Mode, indicating the predetermined operation mode, the value Q_mode specifically indicating one of a Direct Mode suitable for QKD systems that generate quantum-shared secrets at a higher rate and a quantum bit error rate (QBER) of the quantum channel is substantially low or a Combinatorial Mode, suitable to support quantum channels with high quantum bit error rate (QBER), which results in a lower quantity of quantum-shared secrets being generated;
   in response, the initiator receiving from the responder a value, Q_Stat, indicating a status of the array of security associations generated; and
   managing inbound and outbound of the array of security associations in a security association database using a database structure.

2. A method according to claim 1, wherein exchanging quantum-shared secret index from the cryptographic key database in Phase 1 of the Internet key exchange protocol between an initiator and a responder comprises:
   the initiator sending to the responder, a value, Q_ID, representing the quantum-shared secret index; and
   the initiator receiving in response, from the responder, a value, Q_Stat, indicating a status of the exchanging of the quantum-shared secret index in Phase 1 of the Internet key exchange protocol.

3. A method according to claim 1, wherein managing inbound and outbound of the array of security associations in a security association database using the database structure that applies a linked list structure comprises:
   pointing to an active security association in the array of security associations being used in the Internet key exchange session;
   monitoring lifetime of the active security association in the array of security associations using an inbound security association lifetime for an inbound array of security associations and an outbound security association lifetime for an outbound array of security associations; and
   if lifetime of the active security association in the array of security associations has expired
      deleting the active security association from the array of security associations; and
      pointing to a following security association in the array of security associations to be used in the Internet key exchange session.

4. A method according to claim 3, wherein monitoring lifetime of the active security association in the array of security associations comprises monitoring lifetime of an unused security association using an inbound max-lifetime.

5. A method according to claim 1, wherein the cryptographic key database comprises a QKD database.

6. A method according to claim 3, further comprising performing garbage collection on the linked list structure of the security association database to clean up deleted security associations.

7. A system for integrating quantum key distribution with Internet key exchange protocol, wherein the system comprises:
one or more processors;
one or more computer readable media coupled to the one or more processors, wherein the one or more computer readable media comprise computer executable instructions that when executed by the one or more processors are configured to perform the following:
exchanging quantum-shared secret index from a cryptographic key database in Phase 1 of the Internet key exchange protocol between an initiator and a responder;
integrating a number of quantum-shared secrets from the cryptographic key database with a classic shared secret using a predetermined operation mode in Phase 2 of the Internet key exchange protocol to generate an array of security associations to be used by the initiator and the responder during a single Internet key exchange session, wherein integrating a number of quantum-shared secrets from the cryptographic key database with a classic shared secret using a predetermined operation mode in Phase 2 of the Internet key exchange protocol to generate the array of security associations to be used by the initiator and the responder during a single Internet key exchange session comprises:
the initiator sending to the responder:
a value, Q_ID, representing the quantum-shared secret index;
a value N, indicating the number of quantum-shared secrets; and
a value, Q_Mode, indicating the predetermined operation mode, the value Q_mode specifically indicating one of a Direct Mode suitable for QKD systems that generate quantum-shared secrets at a higher rate and a quantum bit error rate (QBER) of the quantum channel is substantially low or a Combinatorial Mode, suitable to support quantum channels with high quantum bit error rate (QBER), which results in a lower quantity of quantum-shared secrets being generated;
in response, the initiator receiving from the responder a value, Q_Stat, indicating a status of the array of security associations generated; and
managing inbound and outbound of the array of security associations in a security association database using a database structure.

8. A system according to claim 7, wherein exchanging quantum-shared secret index from the cryptographic key database in Phase 1 of the Internet key exchange protocol between an initiator and a responder comprises:
the initiator sending to the responder, a value, Q_ID, representing the quantum-shared secret index; and
the initiator receiving in response, from the responder, a value, Q_Stat, indicating a status of the exchanging of the quantum-shared secret index in Phase 1 of the Internet key exchange protocol.

9. A system according to claim 7, wherein managing inbound and outbound of the array of security associations in a security association database using the database structure that applies a linked list structure comprises:
pointing to an active security association in the array of security associations being used in the Internet key exchange session;
monitoring lifetime of the active security association in the array of security associations using an inbound security association lifetime for an inbound array of security associations and an outbound security association lifetime for an outbound array of security associations; and
if lifetime of the active security association in the array of security associations has expired
deleting the active security association from the array of security associations; and
pointing to a following security association in the array of security associations to be used in the Internet key exchange session.

10. A system according to claim 9, wherein monitoring lifetime of the active security association in the array of security associations comprises monitoring lifetime of an unused security association using an inbound max-lifetime.

11. A system according to claim 7, wherein the cryptographic key database comprises a QKD database.

12. A system according to claim 9, further comprising performing garbage collection on the linked list structure of the security association database to clean up deleted security associations.

13. A non-transitory computer readable medium comprising computer executable instructions that when executed by one or more processors causes the following to be performed:
exchanging quantum-shared secret index from a cryptographic key database in Phase 1 of the Internet key exchange protocol between an initiator and a responder;
integrating a number of quantum-shared secrets from the cryptographic key database with a classic shared secret using a predetermined operation mode in Phase 2 of the Internet key exchange protocol to generate an array of security associations to be used by the initiator and the responder during a single Internet key exchange session, wherein integrating a number of quantum-shared secrets from the cryptographic key database with a classic shared secret using a predetermined operation mode in Phase 2 of the Internet key exchange protocol to generate the array of security associations to be used by the initiator and the responder during a single Internet key exchange session comprises:
the initiator sending to the responder:
a value, Q_ID, representing the quantum-shared secret index;
a value N, indicating the number of quantum-shared secrets; and
a value, Q_Mode, indicating the predetermined operation mode, the value Q_mode specifically indicating one of a Direct Mode suitable for QKD systems that generate quantum-shared secrets at a higher rate and a quantum bit error rate (QBER) of the quantum channel is substantially low or a Combinatorial Mode, suitable to support quantum channels with high quantum bit error rate (QBER), which results in a lower quantity of quantum-shared secrets being generated;
in response, the initiator receiving from the responder a value, Q_Stat, indicating a status of the array of security associations generated; and
managing inbound and outbound of the array of security associations in a security association database using a database structure.

14. A non-transitory computer readable medium according to claim 13, wherein exchanging quantum-shared secret index from the cryptographic key database in Phase 1 of the Internet key exchange protocol between an initiator and a responder comprises:

the initiator sending to the responder, a value, Q_ID, representing the quantum-shared secret index; and the initiator receiving in response, from the responder, a value, Q_Stat, indicating a status of the exchanging of the quantum-shared secret index in Phase 1 of the Internet key exchange protocol.

15. A non-transitory computer readable medium according to claim 13, wherein managing inbound and outbound of the array of security associations in a security association database using the database structure that applies a linked list structure comprises:

pointing to an active security association in the array of security associations being used in the Internet key exchange session;

monitoring lifetime of the active security association in the array of security associations using an inbound security association lifetime for an inbound array of security associations and an outbound security association lifetime for an outbound array of security associations; and if lifetime of the active security association in the array of security associations has expired deleting the active security association from the array of security associations; and pointing to a following security association in the array of security associations to be used in the Internet key exchange session.

16. A non-transitory computer readable medium according to claim 15, wherein monitoring lifetime of the active security association in the array of security associations comprises monitoring lifetime of an unused security association using an inbound max-lifetime.

17. A non-transitory computer readable medium according to claim 13, wherein the cryptographic key database comprises a QKD database.

18. A non-transitory computer readable medium according to claim 15, further comprising performing garbage collection on the linked list structure of the security association database to clean up deleted security associations.

* * * * *